United States Patent [19]

Moorehead et al.

[11] Patent Number: 4,678,564
[45] Date of Patent: Jul. 7, 1987

[54] CAST FILTER AND AUTOMATIC SELF-CLEANING BACKFLUSH CONTROL SYSTEM THEREFOR

[75] Inventors: Jack F. Moorehead, San Diego; Richard S. Campbell, Sr., El Cajon, both of Calif.

[73] Assignee: Fairchild Filter Corporation, La Jolla, Calif.

[21] Appl. No.: 798,610

[22] Filed: Nov. 15, 1985

[51] Int. Cl.$^4$ ............................................. B01D 27/12
[52] U.S. Cl. ................................... 210/108; 210/411; 210/425; 210/427
[58] Field of Search ............... 210/108, 424, 425, 427, 210/411, 412

[56] References Cited

U.S. PATENT DOCUMENTS

| | | |
|---|---|---|
| 582,441 | 5/1897 | Stifel ................................. 210/425 |
| 3,096,281 | 7/1963 | Smith et al. |
| 3,302,796 | 2/1967 | Downey |
| 3,486,626 | 12/1969 | Close |
| 4,154,688 | 5/1979 | Pall |
| 4,488,966 | 12/1984 | Schaeffer |
| 4,522,719 | 6/1985 | Kuwajima |

Primary Examiner—Frank Sever
Attorney, Agent, or Firm—Frank D. Gilliam

[57] ABSTRACT

A filter unit includes:

(a) structure providing a porous barrier between a first zone from which liquid to be filtered is supplied, and a second zone to which filtered liquid flows, via the barrier, (b) the barrier including a series of elements defining grooves, and filtering media between those elements and communicating with the grooves, (c) certain of the grooves presented for reception of liquid flow therein from the first zone so that liquid flows from the certain grooves through the media, (d) others of the grooves presented for reception of flow from the media and for subsequent flow via the other grooves to the second zone, (e) control means for providing backflushing only as required as an alternative to periodic backflushing.

The grooves typically extend generally longitudinally and are exposed along their lengths to the barrier in the form of a membrane or membranes, at the sides of said elements, the grooves in the first elements exposed endwise to the first zone, and the grooves in the second elements exposed endwise to the second zone. A simple effective control means is also provided for controlling the direction of liquid flow between the zones, via the grooves and the barrier membrane or membranes.

22 Claims, 9 Drawing Figures

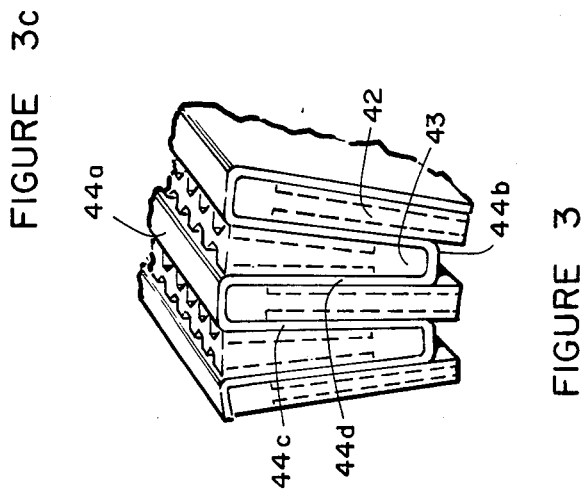
FIGURE 3
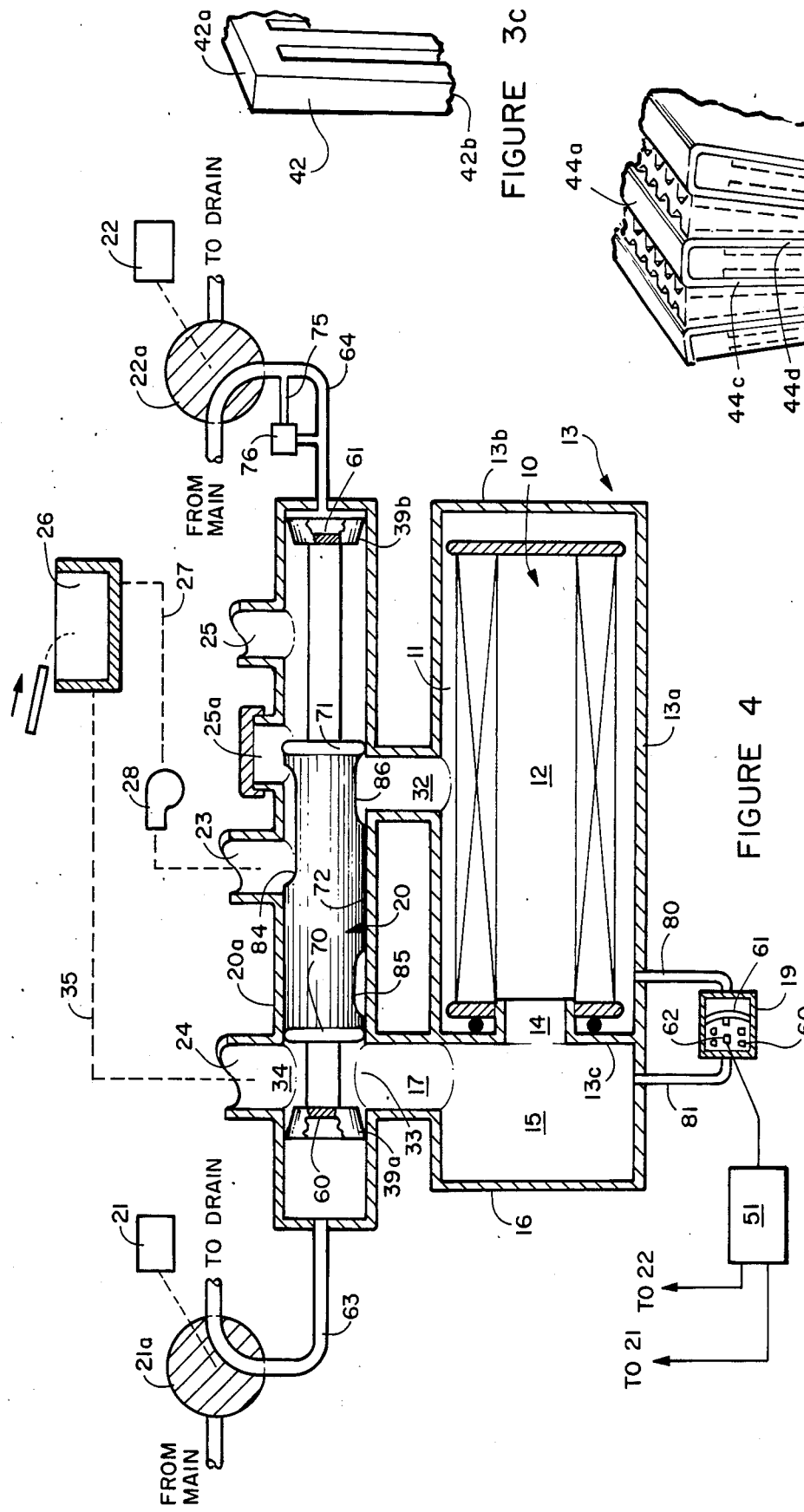
FIGURE 3c
FIGURE 4

CAST FILTER AND AUTOMATIC SELF-CLEANING BACKFLUSH CONTROL SYSTEM THEREFOR

BACKGROUND OF THE INVENTION

This invention relates generally to filters, and more particularly to a very simple liquid filtering system enabling controlled and rapid backflushing.

There is need for reliable and simple filter systems that permit controlled backflushing in an assured and rapid manner, when required, as for example automatically. Also, there is need for a filter element or cartridge having a simple yet rugged construction facilitating such controlled and rapid backflushing, as well as easy installation and replacement of the cartridge in the filtering system. Further, there is need for equipment embodying the unusual structure, functions and modes of operation of the filtering system provided by the invention, as will appear.

SUMMARY OF THE INVENTION

It is a major object of the invention to provide a highly effective filtering system embodying both an unusually advantageous filter unit cartridge, and also an automatic backflush control system. As to the filter unit, it basically comprises:

(a) structure providing a porous barrier between a first zone from which liquid to be filtered is supplied, and a second zone to which filtered liquid flows, via said barrier, (b) the barrier including a series of elements defining grooves, and filtering media between said elements and communicating with the grooves, (c) certain of said grooves presented for reception of liquid flow therein from the first zone so that liquid flows from the certain grooves through said media, (d) others of said grooves presented for reception of flow from said media and for subsequent flow via the other grooves to said second zone.

As will appear, the elements and media may typically extend annularly about one of the zones, so that liquid passes through the filter generally radially; and, for this purpose the elements may typically include first elements which are longitudinally elongated, and have generally rectangular cross sections in lateral planes, and second elements which are longitudinally elongated, and have wedge-shaped cross sections in lateral planes, the grooves extending generally width-wise of said elements. The grooves defined by the elements may then extend generally radially and may be exposed along their lengths to the membrane or membranes at the sides of said elements, the grooves in the first elements exposed to said first zone, and the grooves in the second elments exposed to said second zone.

The automatic backflush control system typically may include control means communicating with said zones for controlling the direction of liquid flow therebetween, via said barrier; and such control means typically includes a liquid pressure sensor, and valving that reverses the direction of said flow between the zones in response to operation of tne sensor to sense build-up of a liquid pressure differential between such zones, above a predetermined level. The control valving typically includes a linearly displaceable valve element having:

(i) a filtering mode position in which the valve element passes liquid flow from a pump port to and forwardly through the filter element and to an outlet port, and (ii) a back flush mode position in which the valve element passes liquid flow from the pump port to and reversely through the filter element and to drain port.

Further, and as will appear, actuator structure is associated with said valve element and includes a first piston surface responsive to fluid pressure application to displace the actuator to said filtering mode position, and a second piston surface responsive to fluid pressure application to displace the actuator to said back flush mode position. Water main pressure connections may then be used, together with control valves to control water main pressure application to one or the other of said piston surfaces as a function of the pressure differential between water inside and outside the filter element.

It is yet another object of the invention to provide a flow restriction in a line that communicates water main pressure to one or the other of the piston surfaces, to slow the flow of water to said surface acting to move the valving from backflush position to normal filtering position. A check valve may be connected across said restriction to block flow of water away from said piston surface, but allows the free flow of water toward that surface, via the check valve. Finally, the pressure sensor may include a diaphragm, opposite sides of which are associated in communication with fluid pressure in said first and second zones, a switch operated in response to deflection of the diaphragm and spring means acting on the diaphragm and acting to support the low pressure side thereof.

These and other objects and advantages of the invention, as well as the details of an illustrative embodiment, will be more fully understood from the following specification and drawings, in which:

DRAWING DESCRIPTION

FIG. 3 is an enlarged fragmentary perspective view taken through a portion of the filter element, to show the paths of liquid flow in one direction through the element;

FIGS. 3b and 3c are fragmentary perspective views of the two types of filter barrier support elements, which are grooved;

FIG. 4 is a section taken through the filter apparatus and showing valve actuator and control means, in filtering mode;

GENERAL ORGANIZATION

Figure 1:
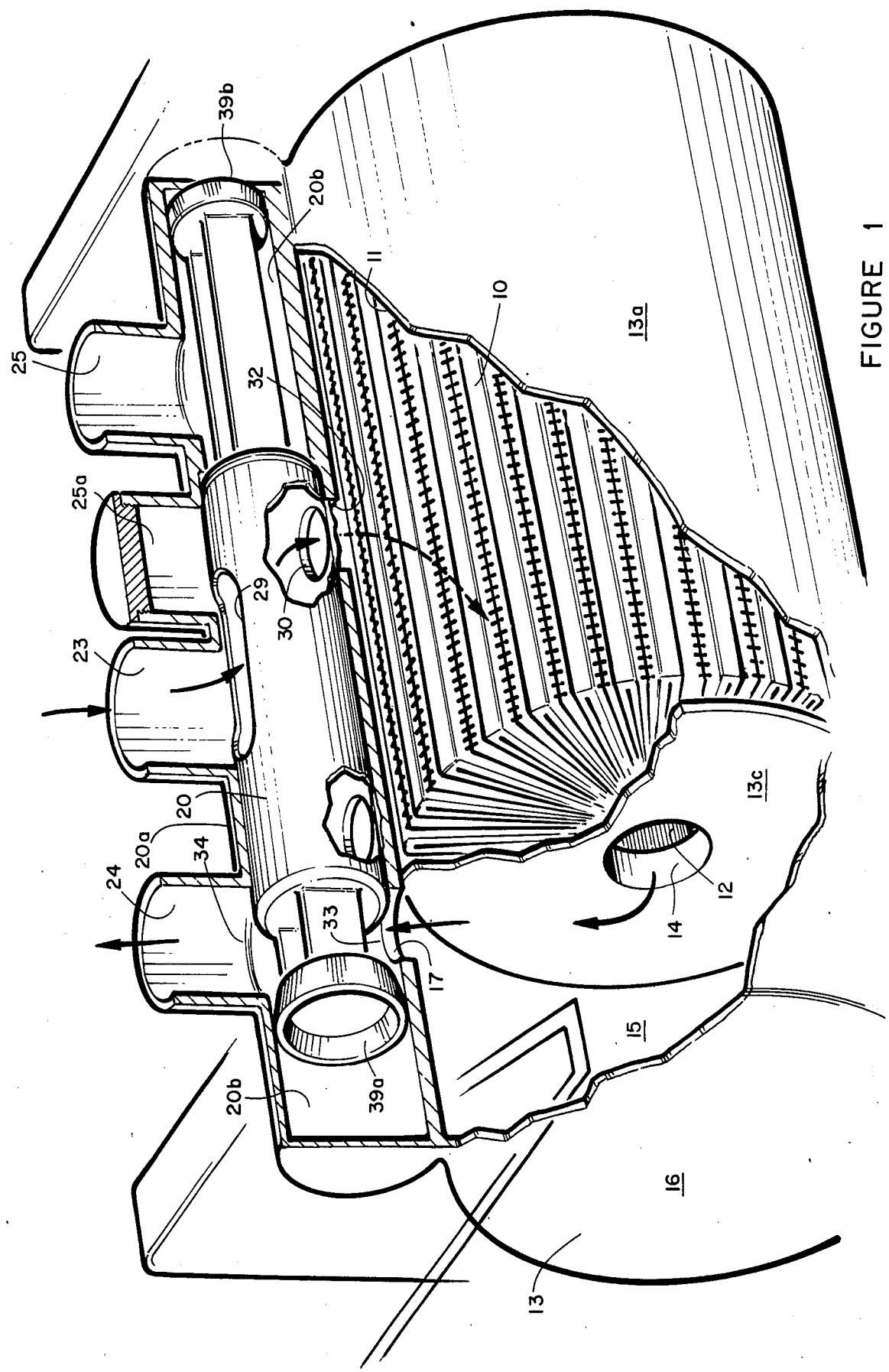
FIG. 1 is a perspective, cutaway view of filter apparatus embodying the invention, and in filter mode.
Figure 2:
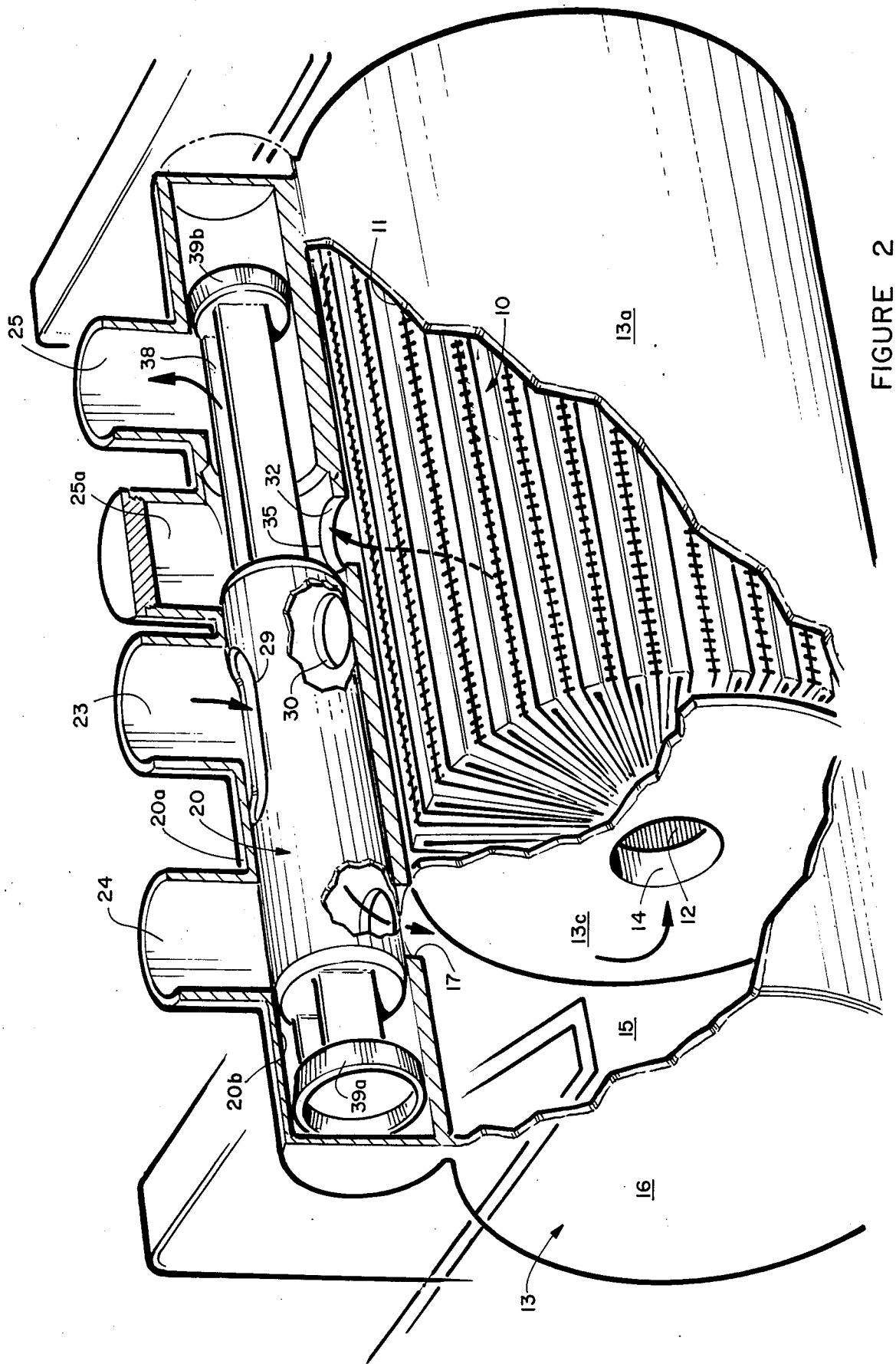
FIG. 2 is a perspective cutaway view like FIG. 1, showing the apparatus in backflush mode.

Referring first to FIGS. 1 and 4, a filter element 10 provides a porous barrier between a first zone from which liquid to be filtered is supplied, and a second zone to which filtered liquid flows, via the barrier. In the example, the first zone may be considered to be outside the filter, as at 11, and the second zone may be considered to be located at 12, i.e. at the inner side of the barrier. While an annular barrier is illustrated, it may take other forms. A filter housing 13 includes annular wall 13a and end walls 13b and 13c. Wall 13b may be removable to permit ease of filter cartridge installation and replacement. A central port 14 in wall 13c passes filtered liquid to a plenum chamber 15 having an end wall 16, and an outlet port at 17. Such liquid may consist, for example, of water.

Control means is provided to communicate with zones 11 and 12 for controlling the direction of liquid flow between such zones, and via the filtering barrier 10. Such control means may include a liquid pressure sensor, as at 19; valving (indicated generally at 20) that reverses the direction of flow between zones 11 and 12 in response to operation of the sensor to sense build-up of a liquid pressure differential between such zones above a predetermined level; and circuitry response to the sensor output to control the valve, as for example via solenoids 21 and 22 which operate control valves 21a and 22a to in turn control water main pressure application to the valving 20. An elongated housing is provided at 20a for the longitudinally shiftable valving 20 (see "filtering mode" and "backflush" positions of valving 20 in FIGS. 4 and 5, respectively). Associated with that housing are a pump port 23, an outlet port 24, and a drain port 25. A service port 25a may be provided.

In filtering mode, (FIG. 4) liquid such as water from a swimming pool 26 is passed via a line 27 and pump 28 to port 23, from which it flows via ports 29 and 30 in leftwardly displaced tubular valve sleeve 31, and port 32 between housings 21 and 13, to zone 11, for flow through the filter. The water then exits the filter and flows via 15 and 17, side ports 33 and 34 in sleeve 31, port 24 and line 35 back to the pool 26.

In back flush mode (FIG. 5), water flows via 27, 28, 23, space 37 in valve 20, port 17 and chamber 15 to the zone 12. The liquid then flows reversely (outwardly) through the filter, and passes via port 32, ports 35 and 38 in the valve 20, to drain port 25. Note seals 39a and 39b engaging bore 20b.

It is seen that zone 11 surrounds the filter in the drawings, and that zone 12 is located centrally of the filter unit.

FILTER DESCRIPTION

Figure 3B:
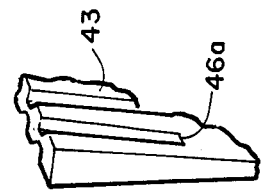
Figure 3A:
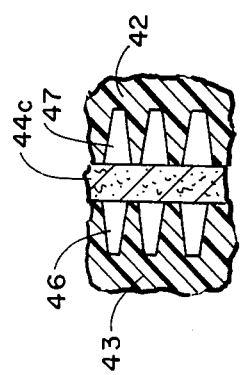
FIG. 3a is a section taken through the filter unit, about midway between its outer and inner surfaces.
Figure 6:
FIG. 6 is an enlarged fragmentary view showing liquid flow through filter media and between grooves in filter elements.

Referring now to FIG. 3, the highly advantageous, compact, and easily cleaned(as by quick backflushing) filter unit is shown to comprise a porous barrier that includes and annular series or sequence of filter media supporting elements defining grooves. First elements 42 are longitudinally (i.e. axially of the filter) elongated, and have generally rectangular cross-section in lateral planes (see FIG. 3c); and second elements 43 are also longitudinally elongated, and have generally wedge-shaped cross-sections in lateral planes (see FIG. 3b, for example). The elements 42 and 43 alternate in circular sequence as is clear from FIG. 3, and the filter media, such as pleated membrane 44, extends between the elements, in the manner shown. Thus, it extends in a corrugated or undulating and folded path over the outer sides 42a of elements 42 at 44a, and over the inner sides 43a of elements 43, as at 44b as well as between the elements as at 44c and 44d In accordance with an important aspect of the invention, certain of the grooves defined by the elements are presented for reception of liquid flow therein, from the first zone 11, so that liquid flows into the grooves from zone 11 and from those grooves to and through the membrane. Others of the grooves are presented for reception of flow from the media or membrane, and for subsequent flow via said other grooves to the second zone. Such certain grooves may be defined as at 46 in the opposite sides of elements 43, and the grooves 46 intersect the outer sides 43b of such elements to receive the flow from zone 11; also they terminate at 46a short of the inner sides 43a of those elements. The other grooves may be defined as at 47 in the opposite sides of elements 42, and grooves 47 intersect the inner sides 42b of the elements 43 to deliver the flow to zone 12. FIG. 6 shows the flow passing from grooves 46 to grooves 47, via the filter media or barrier extents, as at 44c and 44d. Grooves 47 terminate short of ends 42a. Wedge shaping of elements 43 assures annular "stacking" of the alternate elements 42 and 43.

Regarding the membrane itself, it may advantageously consist, for example of, a smooth plastic filter, with cross linked surface cast on a synthetic woven "fabric" material having a high concentration of microscopic pores or openings, between 0.05 microns to 0.5 microns. This cast-media ultrafilteration (UF) film filters the fluid that is pumped through the filtration system, and removes any suspended particles or other contaminants larger than the pore openings in the cast-media UF filter film surface. The cast filter automatically backflushes itself whenever it becomes clogged, and then automatically resume its normal filtration cycle. The smooth "TEFLON"-like surface rejects oily contaminants that normally tend to cling to other conventional filter media. When microscopic contaminants (that have been filtered out of the water flowing through the cast filter element) begin to clog the surface of the filter element, the back pressure on the inside of the filter housing will increase. When the pressure inside the filter element housing as at 11 increases to a predetermined point above the level of the pressure on the inside of the product tube, as at 12, or the plenum chamber 15, a pressure differential transducer 19 which monitors the pressure on both sides of the cast filter element, activates a microswitch which energizes the backflush valve system. That switch and associated circuitry are represented by block 51, which controls solenoids 21 and 22. The backflush valve system automatically reverses water flow through the cast filter element, and the contaiminants collected on the front or outer surface of the cast-media film are pushed away from the surface and flushed through drain outlet 25.

CONTROL SYSTEM DESCRIPTION

Figure 5:
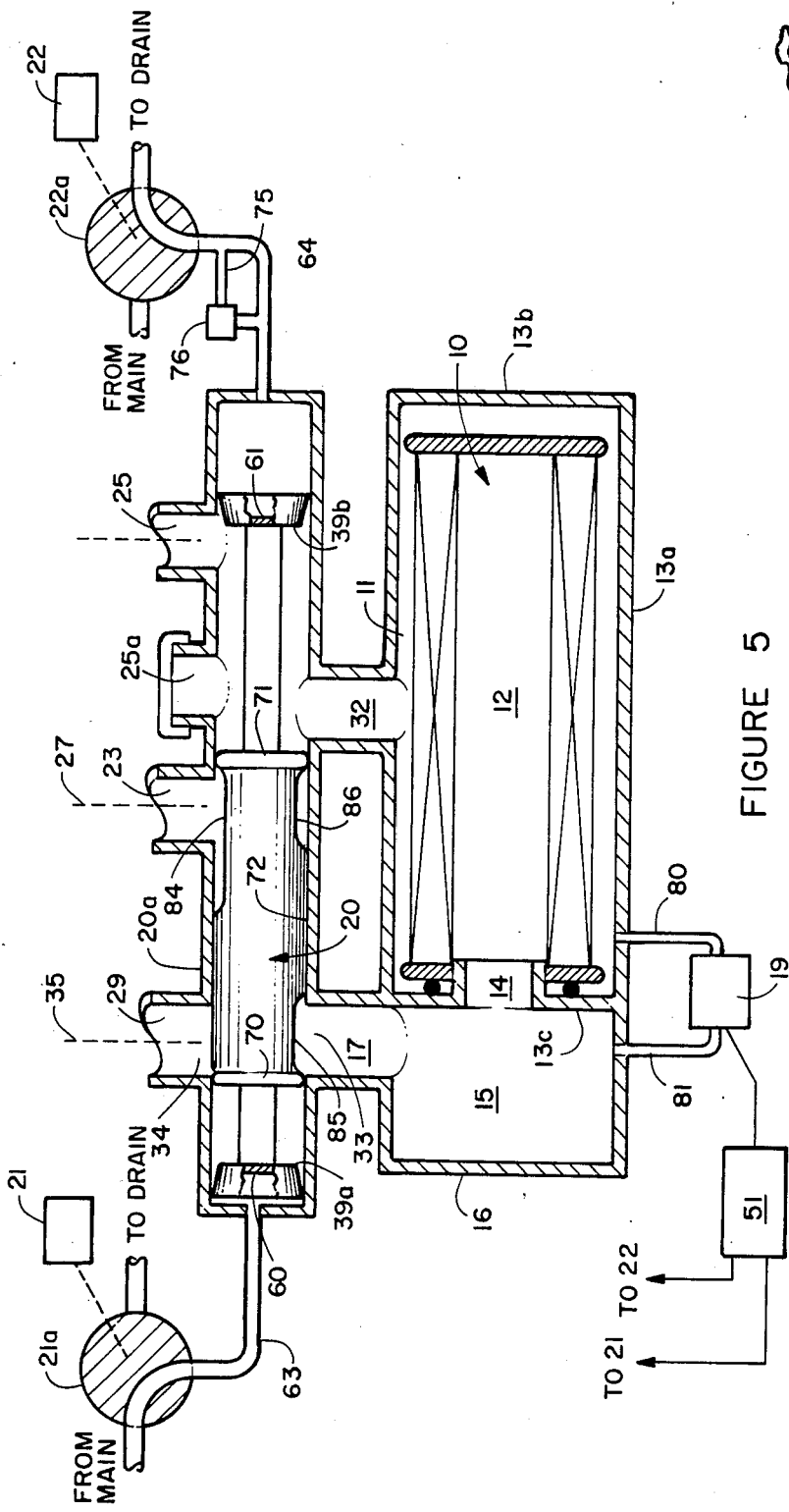
FIG. 5 is a view like FIG. 4, showing the filter apparatus, and actuator and control means in backflush mode.

As further shown in FIGS. 4 and 5, acturator structure is associated with the linearly displaceable valve 20, which as previously mentioned has:

(i) a filtering mode position in which the valve element passes liquid flow from a pump port to and forwardly through the filter element and to an outlet port, and (ii) a back flush mode position in which the valve element passes liquid flow from the pump port to and reversely through the filter element and to a drain port.

The actuator structure includes a first piston surface 61 associated with the valve element (i.e. at its right end) and is responsive to fluid pressure application to displace the valve 20 leftwardly to filtering mode position (see FIG. 4). The actuator structure also includes a second piston surface 60 associated with the valve element (i.e. at its left end), and is responsive to fluid pressure application to displace the valve 20 rightwardly, to backflush mode position. Note line connections 63 and 64 from valves 21a and 22a to the opposite ends of housing 21, to controllably apply water main pressure to the piston surfaces 60 and 61.

As shown in FIG. 4, when the slide valve 20 is displaced to the left, valve 22a is rotated to the position shown, by its solenoid, to communicate water main pressure to piston surface 61; at the same time, valve 21a is rotated to the position shown, by its solenoid, to pass water at the left end of the piston surface 60 to the drain port 25. When the slide valve is displaced to the right, the valves 21a and 22a are rotated to the positions shown in FIG. 5, whereby water at the right of piston surface 61 is discharged to drain, and water main pressure is applied to piston surface 60.

An orifice restriction 70 is desirably connected into line 64, to retard water flow from the piston surface 61, and thereby retard, i.e. slow, rightward displacement of valve 20. Water flow from the chamber to the right of piston surface 61, on rightward displacement of the valve 20 is slowed by the restriction to provide additional "dwell time" as the valve moves to backflush position of FIG. 5, enabling complete removal of contaminants from the outer side of the filter housing. A by-pass line 75 around the restriction contains a check valve 76, which blocks flow of water in line 75 away from the piston surface 61 toward control valve 22a, but allows free flow of water from valve 22a toward piston surface 61. These elements allow the sliding valve 20 to move rapidly to the left when the backflush mode is activated, but at a slower rate of spaced as the slide valve 20 moves to the right, to its normal filtering position.

In FIGS. 4 and 5, one side of the pressure differential transducer 19 is connected at 80 to the inside of the filter element housing, and the other side of the transducer is connected at 81 to chamber 15 communicating with the inside of the filter element. Pressure is always higher on the outside surface or inlet side of the filter element, and lower on the inside or outlet side of the filter element. The pressure differential transducer may have a preset spring 60 compensates for this pressure differential by applying additional pressure against the low pressure side of a diaphragm 61 inside the transducer. This preset spring helps support the low pressure side of the diaphragm inside the transducer, maintaining a balanced position when the pressure on the outside of the cast filter element is equal to anticipated pressure level when the cast filter element is clean.

Spring assisted pressure balance applied against both sides of the diaphragm holds the diaphragm in a relatively flat position. When pressure on the filter housing side of the element begins to increase from blocked flow by contaminants accumulating on the filter element surface, the diaphragm will bend towards the lower pressure side, pressing a microswitch 62 that will activate the solenoids 21 and 22 that control valves 21a and 22a. When the effluent water flow through the cast filter element is reversed by the backflush slide 20, the pressure will drop on the filter element side of the transducer, releasing the micro switch and de-energizing the solenoids that operate valves 21a and 22a. The water pressure will then switch back to the other end of the slide valve 20, and the restriction 70 in the line 64 will slow the movement of the slide. As the effluent water flow slowly resumes its normal path through the filter housing and the filter element, the pressure on the filter housing side will increase rapidly. This reversing of the water flow through the filter housing may cause a water hammer, or surge of pressure highter than the actual pressure differential of the clean filter element. A predetermined restriction or orifice 85 in the line 80 of the pressure differential transducer, between the filter element high pressure side and the high side of the transducer will buffer the pressure shock wave or water hammer that might otherwise jam the diaphragm of the transducer against the micro switch, starting another backflush cycle and premature discharge into the waste line.

Further unusual advantages of the invention include:

1. The interlocking outside and inside support spacers 42 and 43 of the pleated cast filter element 10 prevent the filter media 44 from collapsing inward during the normal filteration cycle, and being pushed outward during the backflush cycle. By holding the cast filter surface material away from the opposite pleats, the inside and outside space separators provide an improved rate of water flow through the pleated cast filter element in either direction.

2. The inside and outside support spacers 42 and 43 act as a loom during the assembly of the cast filter element, holding the cast media material in position while the cast filter element is being assembled. The space separators also eliminate the possibility of damage to the membrane surface from excess movement during the normal filtration cycle, and act as a leaf strainer during the filtration cycle.

3. The two speed, backflush slide system that moves quickly in one direction, but at a slower speed in the other direction, creates a two speed action without any moving parts, other than the two solenoid valves and the slide assembly itself. This controlled two-speed action provides an extended period of water flow through the cast filter element during the backflushing cycle.

4. A predetermined restriction inside the high pressure side of the line leading to the pressure differential transducer prevents an excess pressure increase during the transition from the backflush mode to the filter mode. This prevents any returning pressure surge at the end of the backflush cycle from depressing the diaphragm of the transducer and prematurely re-energizing the solenoid valves.

Referring again to FIGS. 1, 2, 4 and 5, the ports associated with the housing 20a may be classifed as follows:

flow inlet (first) port 23 flow outlet (second) port 34 spaced at one side of port 23 drain (third) port 25 spaced at the opposite side of port 23 fourth and fifth ports 34 and 32 spaced along the housing to communicate with the opposite sides respectively of the filter barrier 10.

The valving also includes four annular seals 39a, 70, 71 and 39b that engage the housing bore 72, along its length, and further characterized in that a filter position of the valving, the first and second seals 39a and 70 straddle said second port 34 and said fourth port 33; said second and third seals 70 and 71 straddle the first port 23 and the fifth port 32; and the third and fourth seals 71 and 39b straddle said third port 25; and in backflush position of the valving, the second and third seals 70 and 71 straddle the first and fourth ports 23 and 33 (port 34 being blanked by the valve spool) the third and fourth seals 71 and 39b straddle the third and fifth ports 25 and 32.

Finally, the valving 20 includes a cylindrical spool 83 between seals 70 and 71; and the spool has primary, secondary, and tertiary ports 84–86, ports 84 and 86 registering with the first and fifth ports 23 and 32 in filter position; and the primary and secondary ports 84 and 85 registering with the first and fourth ports 23 and 33, in backflush position.

We claim:

1. In a filter, the combination comprising:
   (a) structure providing a porous barrier between a first zone from which liquid to be filtered is supplied, and a second zone to which filtered liquid flows, via said barrier,
   (b) said barrier including a series of elements defining grooves, and filtering media between said elements defining grooves, and filtering media between said elements and communicating with said grooves, said elements include first elements which are longitudinally elongated, and have generally rectangular cross sections in lateral planes, and second elements which are longitudinally elongated, and have wedge-shaped cross section in lateral planes, the grooves extending generally width-wise of said elements, said first elements sequentially alternate with said second elements, said filtering media comprises a membrane a membranes which extend in undulating folds between said first and second elements,
   (c) said grooves of said first element being for reception of liquid flow therein from said first zone so that liquid flows from said grooves of said first barrier through said media,
   (d) said groves in said second barrier being presented for of flow from said media and for subsequent flow via said second barrier grooves to said second zone.
   (e) control means for providing backflushing of said filter only as requried, as an alternative to periodic backflushing.

2. The filter of claim 1 wherein said elements and media at least partially surround one of said zones.

3. The filter of claim 2 wherein said elements and media extend generally annularly about said one zone.

4. The filter of claim 3 including control means communicating with aid zones for controlling the direction of unfiltered liquid flow therebetween, via said barrier.

5. The filter of claim 4 wherein said control means includes a liquid pressure sensor, and valving that reverses the direction of said flow of said unfiltered liquid between said zones in response to operation of said sensor to sense build-up of a liquid pressure differential between said zones, above a predetermined level.

6. The filter of claim 5 wherein said valving includes a linearly displaceable valve element having
   (i) a filtering mode position in which the valve element passes liquid flow from a pump port to and forwardly through the filter element and to an outlet port, and
   (ii) a back flush mode position in which the valve element passes liquid flow from the pump port to and reversely through the filter element and to a drain port.

7. The filter of claim 6 including actuator structure associated with said valve element and including a first piston surface responsive to fluid pressure application to displace the element to said filtering mode position, and a second piston surface responsive to fluid pressure application to displace the element to said back flush mode position.

8. The filter of claim 7 including a housing structure including a first chamber receiving said filter element, and a second chamber receiving said valve element, said chambers longitudinally elongated and located proximate one another.

9. The filter of claim 7 including water main pressure connections including control valves to control water main pressure application to one or the other of said piston surfaces as a function of the pressure differential between water inside and outside said filter element.

10. The combination of claim 9 including a flow restriction in a line that communicates water main pressure to one or the other of said piston surfaces to slow the flow of water to of from said surface acting to move the valving from backflush position to normal filtering position.

11. The combination of claim 10 including a check valve connected across said restriction to block flow of water away from said piston surface, but allows the free flow of water toward said surface, via the check valve.

12. The combination of claim 5 including means operatively connected with said valving that reverses direction, to slow the movement of the valving as it moves from backflush position to normal filtering position.

13. The combination of claim 5 wherein said sensor includes a diaphragm, opposite sides of which are connected in communication with fluid pressure in said first and second zones, a switch operated in response to deflection of the diaphragm, and spring means acting on the diaphragm and acting to support the low pressure side thereof.

14. the combination of claim 13 including an orifice restriction in a line connecting the high pressure side of the diaphragm to said first zone to buffer pressure shock wave transmission to the diaphragm that might otherwise act to deflect the diaphragm and cause premature reversing of said valving.

15. The filter of claim 2 including a housing surrounding said filter element, to define one of said zones between the housing and one side of said barrier.

16. Filter apparatus, comprising:
   (a) structure providing a porous barrier between a first zone from which liquid to be filtered is supplied, and a second zone to which filtered liquid flows, via said barrier,
   (b) control means communicating with said zones for controlling the direction of unfiltered liquid flow therebetween, via said barrier,
   (c) said control means for providing backflushing of said porous barrier only as required, as an alternative to periodic backflushing, including a liquid pressure sensor, and valving that reverses the direction of said flow between said zones in response to operation of said sensor to sense build-up of a liquid pressure differential between such zones, above a predetermined level
   (d) actuator structure for said valving and including a first piston surface responsive to fluid pressure application to displace the valving in one direction to filtering position, and a second piston surface responsive to fluid pressure application to displace the valving in the opposite direction to backflush position, (e) control fluid pressure connections including control valves to control fluid pressure application to one or the other of said piston surfaces as a function of the fluid pressure differential as between said zones, (f) and means operatively connected with said control fluid pressure connections to slow the movement of said valving as it moves between backflush position and normal filtering position.

17. The combination of claim 16 including a flow restriction in a line that communicates water main pressure to one or the other of said piston surfaces to slow the flow of water to or from said surface acting to move the valving from backflush position to normal filtering position.

18. The combination of claim 17 including a check valve connected across said restriction to block flow of water away from said piston surface, but allows the free flow of water toward said surface, via the check valve.

19. The combination of claim 16 wherein said sensor includes a diaphragm, opposite sides of which are connected in communication with fluid pressure in said first and second zones, a switch operated in response to deflection of the diaphragm, and spring means acting on the diaphragm and acting to support the low pressure side thereof.

20. The combination of claim 19 including an orifice restriction in a line connecting the high pressure side of the diaphragm to said first zone to buffer pressure shock wave transmission to the diaphragm that might otherwise act to deflect the diaphragm and cause premature reversing of said valving.

21. The apparatus of claim 16 including an elongated housing for said valving, said housing including a flow inlet first port a flow outlet second port spaced along said housing at one side of said inlet port, a drain third port spaced along said housing at the oppposite side of said first port, fourth and fifth ports spaced along said housing to communicate with the opposite sides of said barrier, respectively, and said valving includes four seals spaced lengthwise thereof to engage a bore defined by the housing, and further characterized in that (i) in filter position of the valving, the first and second seals straddle said second port and said fourth port, said second and third seals straddle the first port and the fifth port, and the third and fourth seals straddle said third port; and (ii) in backflush position of the valving, the second and third seals straddle the first and fourth ports, and the third and fourth seals straddle the third and fifth ports.

22. The apparatus of claim 21 wherein the valving includes a cylindrical spool between the second and third seals, and having primary, secondary and tertiary ports, the primary and tertiary ports registering with the first and fifth ports in said filtering position, and the primary and secondary ports registering with the first and fourth ports in said backflush position.

* * * * *